United States Patent
Okajima et al.

(10) Patent No.: US 7,668,959 B2
(45) Date of Patent: Feb. 23, 2010

(54) LINK MANAGER AND LINK MANAGEMENT METHOD

(75) Inventors: Ichiro Okajima, Yokohama (JP); Takehiro Ikeda, Gose (JP); Takuya Shinozaki, Yokohama (JP); Koji Omae, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 769 days.

(21) Appl. No.: 10/083,114

(22) Filed: Feb. 27, 2002

(65) Prior Publication Data

US 2002/0120766 A1   Aug. 29, 2002

(30) Foreign Application Priority Data

Feb. 28, 2001  (JP)  ............................. 2001-055421

(51) Int. Cl.
*G06F 15/16* (2006.01)
(52) U.S. Cl. ................... 709/228; 709/227; 709/229; 709/232
(58) Field of Classification Search ............... 709/232, 709/239
See application file for complete search history.

(56) References Cited

U.S. PATENT DOCUMENTS

| | | | | |
|---|---|---|---|---|
| 5,999,517 A | * | 12/1999 | Koning et al. | 370/255 |
| 6,092,117 A | * | 7/2000 | Gladwin et al. | 709/239 |
| 6,240,463 B1 | * | 5/2001 | Benmohamed et al. | 709/238 |
| 6,363,319 B1 | * | 3/2002 | Hsu | 701/202 |
| 7,296,087 B1 | * | 11/2007 | Ashwood Smith | 709/238 |

FOREIGN PATENT DOCUMENTS

EP    1 026 867    8/2000

OTHER PUBLICATIONS

Wang, H. J. "Policy-Enabled Handoffs Across Heterogeneous Wireless Networks." WMCSA, New Orleans, LA, 1999.*
Eckhardt, David A. and Steenkiste, Peter, "Effort-limited Fair (ELF) Scheduling for Wireless Networks," Mar. 2000, IEEE, vol. 3, pp. 1097-1106.*
Ayyagari, Deepak et al, "A Unified Approach to Scheduling, Access Control and Routing for Ad-Hoc Wireless Networks," May 2000, IEEE, vol. 1, pp. 380-384.*
H. J. Wang, et al., Mobile Computing Systems and Applications, XP-010323392, pp. 51-60, "Policy-Enabled Handoffs Across Heterogeneous Wireless Networks", Feb. 25, 1999.
A. Myles, et al., IEEE Journal on Selected Areas in Communications, vol. 13, No. 5, XP-000499090, pp. 839-849, "A Mobile Host Protocol Supporting Route Optimization and Authentication", Jun. 1, 1995.
C. Perkins, RFC 2002, XP-002187650, pp. 1-79, "IP Mobility Support", Oct. 1996.

* cited by examiner

*Primary Examiner*—Vivek Srivastava
*Assistant Examiner*—Azizul Choudhury
(74) *Attorney, Agent, or Firm*—Oblon, Spivak, McClelland, Maier & Neustadt, L.L.P.

(57) ABSTRACT

There is disclosed a link manager comprises detecting unit for detecting what link is installed; managing unit for defining a plurality of link metrics indicating characteristics of each link detected and managing data corresponding to the respective link metrics on a table; and selecting unit for selecting a link having link metrics complying with a given condition.

18 Claims, 8 Drawing Sheets

| preference / metric priority for link selection | cost | quality | security | communication time |
|---|---|---|---|---|
| 1 | enabled/disabled | enabled/disabled | enabled/disabled | enabled/disabled |
| 2 | connectivity | connectivity | connectivity | connectivity |
| 3 | cost | throughput | encryption support | power consumption |
| 4 | throughput | packet loss rate | cost | sleep mode support |
| 5 | packet loss rate | latency | throughput | cost |
| 6 | latency | QoS support | packet loss rate | throughput |
| 7 | link type | link type | latency | packet loss rate |
| 8 | tolerable speed | tolerable speed | link type | latency |
| 9 | QoS support | cost | tolerable speed | link type |
| 10 | encryption support | encryption support | QoS support | tolerable speed |
| 11 | power consumption | power consumption | power consumption | QoS support |
| 12 | sleep mode support | sleep mode support | sleep mode support | encryption support |

Fig.3

| name | definition | variability |
|---|---|---|
| technology standard | standard of link technology | constant |
| cost | billing scheme(flat/time/usage), cost/billing unit | |
| link type | wired link or wireless link | |
| tolerable speed | tolerable speed of host | |
| QoS support | availability of link-level QoS | |
| encryption support | availability of link-level packet encryption | |
| power consumption | power consumption of link interface device | |
| sleep mode support | availability of low-power consumption mode | |
| enabled/disabled | indication of enabled or disabled set by user | variable |
| connectivity | connectivity of link | |
| throughput | throughput of link | |
| packet loss rate | packet loss rate of link | |
| latency | packet transmission latency of link | |

Fig.4

| preference<br>metric priority<br>for link selection | cost | quality | security | communication time |
|---|---|---|---|---|
| 1 | enabled/disabled | enabled/disabled | enabled/disabled | enabled/disabled |
| 2 | connectivity | connectivity | connectivity | connectivity |
| 3 | cost | throughput | encryption support | power consumption |
| 4 | throughput | packet loss rate | cost | sleep mode support |
| 5 | packet loss rate | latency | throughput | cost |
| 6 | latency | QoS support | packet loss rate | throughput |
| 7 | link type | link type | latency | packet loss rate |
| 8 | tolerable speed | tolerable speed | link type | latency |
| 9 | QoS support | cost | tolerable speed | link type |
| 10 | encryption support | encryption support | QoS support | tolerable speed |
| 11 | power consumption | power consumption | power consumption | QoS support |
| 12 | sleep mode support | sleep mode support | sleep mode support | encryption support |

Fig. 6

| link metrics | record | | | |
|---|---|---|---|---|
| latency [sec] | 0.2 | 0.005 | 0.05 | 0.001 |
| packet loss rate [%] | 0.1 | 0.01 | 0.0001 | 0.0001 |
| throughput [bps] | 384K | 11M | 56K | 1G |
| connectivity | yes | yes | no | yes |
| enabled /disabled | enabled | enabled | disabled | enabled |
| sleep mode support | yes | yes | no | no |
| power consumption [W] | 1 | 0.94 | 0.65 | 14 |
| encryption support | yes | yes | no | no |
| QoS support | no | no | no | yes |
| tolerable speed [km/h] | 100 | 16 | 0 | 0 |
| link type | wireless link | wireless link | wireless link | wired link |
| cost | usage-based ¥2/ 128byte | flat rate | time-based ¥8.8/ 3min. | free |
| technology standard | IMT-2000 | IEEE 802.11 | dial-up | IEEE 802.3z |

Fig. 8

| link metrics | comparison rules |
|---|---|
| technology standard | N/A |
| cost | free > flat rate > usage-based > time-based |
| link type | wireless link > wired link |
| tolerable speed | high speed > slow speed |
| QoS support | yes > no |
| encryption support | yes > no |
| power consumption | low power consumption > large power consumption |
| sleep mode support | yes > no |
| enabled/disabled | enabled > disabled |
| connectivity | yes > no |
| throughput | large throughput > small throughput |
| packet loss rate | low packet loss rate > high packet loss rate |
| latency | small latency > large latency |

LINK MANAGER AND LINK MANAGEMENT METHOD

BACKGROUND OF THE INVENTION

1. Field of the Invention

The present invention relates to a link manager and a link management method for managing plural types of links installed on a mobile host.

2. Related Background Art

In recent years, a variety of communication paths (hereinafter referred to as "links") adapted to IP (Internet Protocol) have emerged one after another, irrespective of wireless and wired links, and became available under various environments. For this reason, a moving host, i.e., a mobile host became allowed to move while maintaining communications from link to link by making use of IP mobility protocols such as Mobile IP and others. Further, it became feasible to use plural types of links at a certain location and to load a single mobile host simultaneously with plural types of links because of attainment of downsizing and lower power consumption of interfaces with these links (connecting devices with the links) and implementation of programmable interface apparatus by software wireless means and the like.

SUMMARY OF THE INVENTION

The present invention has been accomplished under such circumstances and an object of the invention is to provide comfortable connection environments for the user of the mobile host by substantiating automatic selection of a link complying with a condition requested by the user or applications, from plural types of links installed on the mobile host.

For accomplishing the above object, a link manager according to the present invention is configured to comprise detecting means for detecting what link is installed; managing means for defining a plurality of link metrics indicating characteristics of each link detected and managing data corresponding to the respective link metrics on a table; and selecting means for selecting a link having link metrics complying with a given condition.

The link manager may be configured so that the managing means generates a record comprised of the data corresponding to the respective link metrics, for each link on the table.

The link manager may be configured so that when a new link corresponding to neither record is detected, the managing means generates a record corresponding to the new link and records data corresponding to link metrics of the link and so that when a link corresponding to either record becomes undetectable, the managing means deletes the record.

The link manager may be configured to comprise link metric rank assigning means for assigning ranks to the respective link metrics, based on a predetermined preference; and data rank assigning means for assigning ranks to the data corresponding to the respective link metrics; and configured so that when the predetermined preference is given, the selecting means selects a link corresponding to a record having data with a highest rank thus assigned, at a link metric with a highest rank.

The link manager may be configured so that when there exist a plurality of records having data with the highest rank thus assigned, the selecting means selects a link corresponding to a record having data with a highest rank thus assigned, at a link metric with a next highest rank.

A link management method according to the present invention is configured to comprise a detecting step of detecting what link is installed; a managing step of defining a plurality of link metrics indicating characteristics of each link detected and managing data corresponding to the respective link metrics on a table; and a selecting step of selecting a link having link metrics complying with a given condition.

The link management method may be configured to comprise a step of generating a record comprised of the data corresponding to the respective link metrics, for each link on the table.

The link management method may be configured to comprise a step wherein when a new link corresponding to neither record is detected, a record corresponding to the new link is generated and data corresponding to link metrics of the link is recorded and wherein when a link corresponding to either record becomes undetectable, the record is deleted.

The link management method may be configured to comprise a step of assigning ranks to the respective link metrics, based on a predetermined preference; and a step of assigning ranks to the data corresponding to the respective link metrics; and configured so that the selecting step comprises a step of, when the predetermined preference is given, selecting a link corresponding to a record having data with a highest rank thus assigned, at a link metric with a highest rank.

The link management method may be configured so that the selecting step comprises a step of, when there exist a plurality of records having data with the highest rank thus assigned, selecting a link corresponding to a record having data with a highest rank thus assigned, at a link metric with a next highest rank.

A program according to the present invention is configured to effect execution of the following processes: a process of detecting what link is installed; a process of defining a plurality of link metrics indicating characteristics of each link detected and managing data corresponding to the respective link metrics on a table; a process of generating a record comprised of the data corresponding to the respective link metrics, for each link on the table; a process of assigning ranks to the respective link metrics, based on a predetermined preference; a process of assigning ranks to the data corresponding to the respective link metrics; and a process of, when the predetermined preference is given, selecting a link corresponding to a record having data with a highest rank thus assigned, at a link metric with a highest rank.

The program may be configured to comprise a process of, when there exist a plurality of records having data with the highest rank thus assigned, selecting a link corresponding to a record having data with a highest rank thus assigned, at a link metric with a next highest rank.

The program may be configured to comprise a process wherein when a new link corresponding to neither record is detected, a record corresponding to the new link is generated and data corresponding to link metrics of the link is recorded and wherein when a link corresponding to either record becomes undetectable, the record is deleted.

A recording medium according to the present invention is a computer-readable memory in which the program as set forth in either one of claim 11 to claim 13 is recorded.

According to the present invention, as described above, a link complying with a condition requested by the user or applications is automatically selected out of a plurality of various links installed on a mobile host, which makes it feasible to provide comfortable connection environments for the user of the mobile host.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a diagram showing the typical link metrics used when the link manager manages the links.

FIG. 4 is a diagram showing an example of preferences.

FIG. 6 is a diagram showing a link management table used in a link detecting process.

FIG. 8 is a diagram showing priority ranks of the data corresponding to the respective link metrics.

DESCRIPTION OF THE PREFERRED EMBODIMENTS

Figure 1:
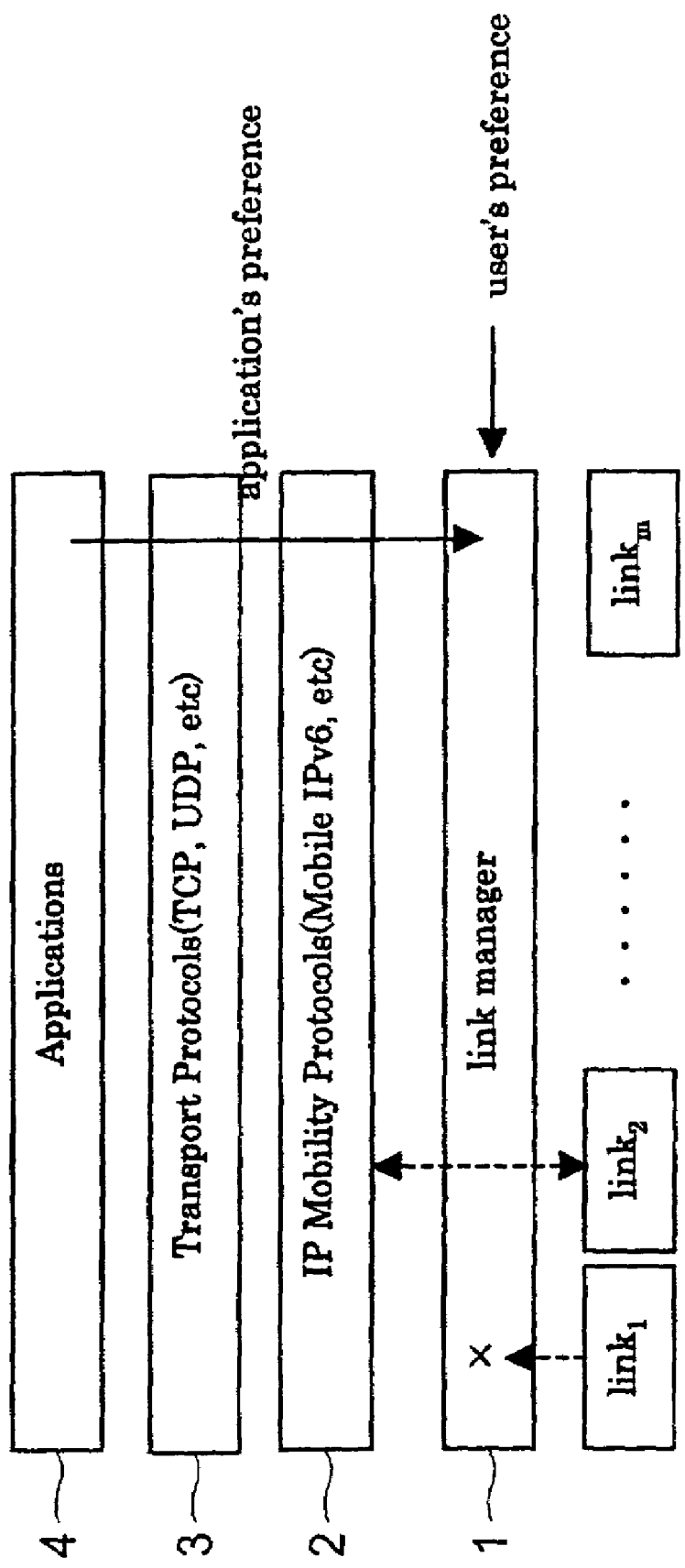
FIG. 1 is a diagram showing the placement of the link manager in a protocol stack provided in the mobile host.
Figure 2:
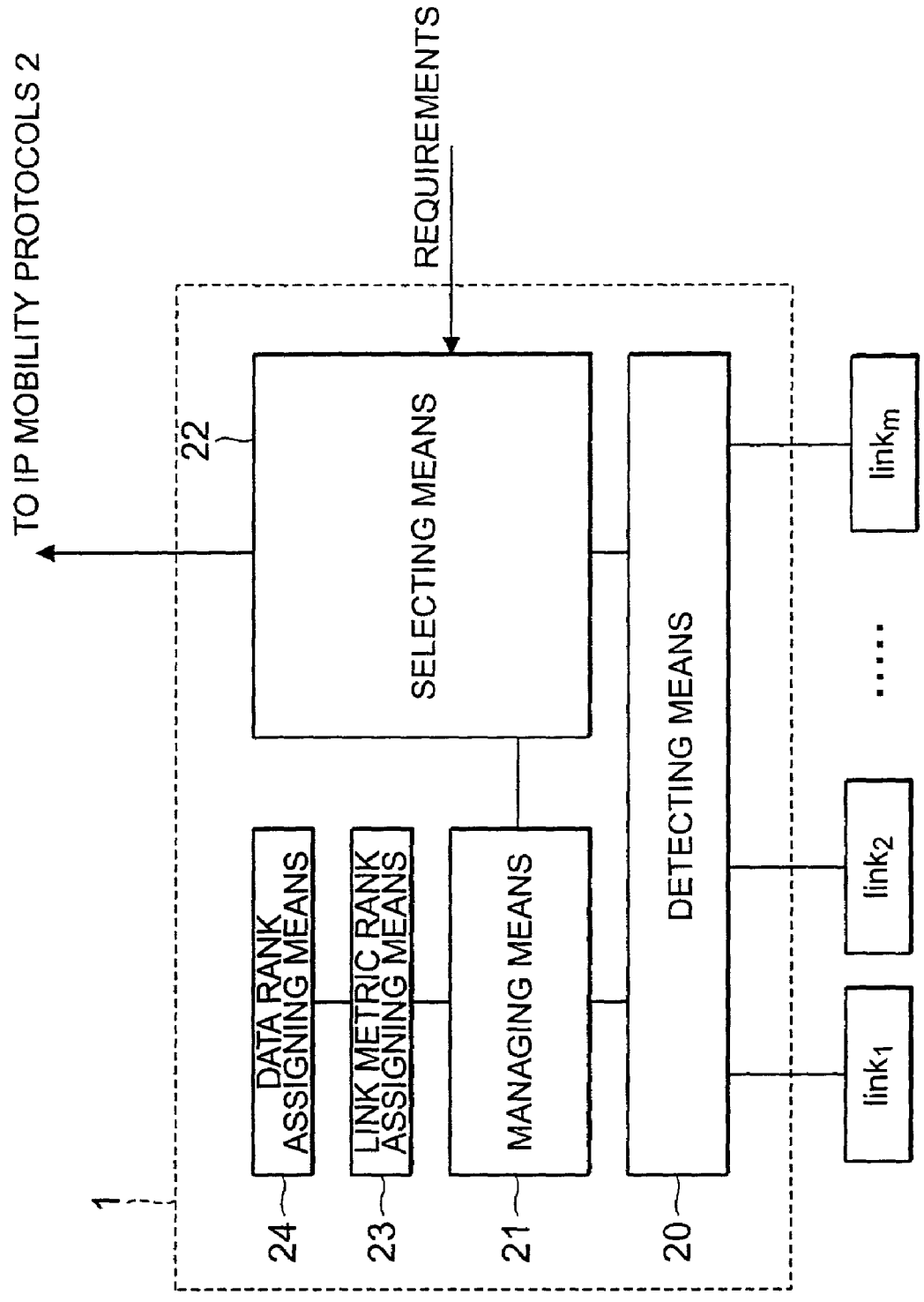
FIG. 2 is a block diagram showing the schematic structure of the link manager.

FIG. 1 is a diagram showing the placement of the link manager in a protocol stack provided in the mobile host. FIG. 2 is a block diagram showing the schematic structure of the link manager 1. As shown in FIG. 1, the link manager 1 is located between a group of links ($link_1$ to $link_m$) installed on the mobile host, and IP mobility protocols 2. The link manager 1 provides only a link most complying with requirements given by the user and/or applications, for the IP mobility protocols 2 while managing states of the respective links.

As shown in FIG. 2, the link manager 1 comprises detecting means 20 for detecting what link ($link_1$ to $link_m$) is installed; managing means 21 for defining a plurality of link metrics indicating characteristics of each link detected by the detecting means 20 and managing data corresponding to the respective link metrics on a table; and selecting means 22 for selecting a link having link metrics complying with the given requirements and providing the link thus selected, for the IP mobility protocols 2. The link manager 1 also comprises link metric rank assigning means 23 for assigning ranks to the respective link metrics, based on a predetermined preference; and data rank assigning means 24 for assigning ranks to data corresponding to the respective link metrics.

In FIG. 1, the IP mobility protocols 2 perform mobility management for maintaining communications, whenever the link manager 1 stops providing a link used heretofore ($link_1$) and provides a new link ($link_2$) instead.

The mobility management by the IP mobility protocols 2 is carried out as follows. For example, where a new link is provided from the link manager 1 while Mobile IPv6 (Internet Protocol version 6) is used as an IP mobility protocol, it acquires a c/o address (Care-of Address) from the link, puts a correspondence between a home address and the c/o address into a Binding Update packet, and sends it to a home agent and a correspondent host. The home address herein is an address independent of the links, which is used by transport protocols 3 (Transport Protocols) and applications 4 in FIG. 1. The transport protocols 3 are, for example, TCP, UDP, and so on. On the other hand, the c/o address is an address dependent on the link, which is used for forwarding a packet directed to the home address, to the link currently under use. Mobile IPv6 repeatedly carries out the mobility management at every switching of the link provided by the link manager 1, so as to maintain communications between the mobile host and the correspondent host.

FIG. 3 is a diagram showing typical link metrics used when the link manager 1 manages the links. The link metrics are indicators indicating various characteristics of each link and, for example, each of the metrics is defined as shown in FIG. 2. The metric named "technology standard" is a link metric indicating a standard of technology on which the link is based. The technology standards are defined by various standardization organisms; for example, there are IMT2000, IEEE802.11, IEEE802.3z, Bluetooth, and so on. The metric named "cost" is a link metric indicating cost necessary for use of the link. The cost is determined by a billing scheme and a cost per billing unit. The billing scheme is either of free (no charge), flat rate billing (fixed charge scheme), time-based billing (time charge scheme), usage-based billing (as-used charge scheme), and so on. The metric named "link type" is a link metric indicating whether the link is a wired link or a wireless link. The metric named "tolerable speed" is a link metric indicating a tolerable moving speed of the mobile host capable of using the link. The metric named "QoS support" is a link metric indicating whether packet transmission with link-level QoS is supported. The metric named "encryption support" is a link metric indicating whether link-level packet encryption is supported. The metric named "power consumption" is a link metric indicating power consumption of the interface device of the link. The metric named "sleep mode support" is a link metric indicating whether a low-power consumption mode (sleep mode) is available during periods of no packet transmission at the link. An example of the low-power consumption mode is an intermittent reception action in which the receiver is intermittently activated at a wireless link.

The metric named "enabled/disabled" is a link metric indicating whether the user forcedly has set the link enabled or disabled. The metric named "connectivity" is a link metric indicating whether the link is connectible. The metric named "throughput" is a link metric indicating a measured value of throughput of the link. The metric named "packet loss rate" is a link metric indicating a measured value of packet loss rate. The metric named "latency" is a link metric indicating a measured value of packet transmission latency of the link.

These link metrics are classified under constant metrics and variable metrics. The metrics of technology standard, cost, link type, tolerable speed, QoS support, encryption support, power consumption, and sleep mode support are constant metrics, while the metrics of enabled/disabled, connectivity, throughput, packet loss rate, and latency are variable metrics. Since the constant link metrics can be uniquely determined, the link manager 1 does not have to monitor these link metrics. However, since the variable link metrics can vary with a lapse of time, the link manager 1 has to monitor these link metrics.

The diversity of the link metrics as described above makes it very troublesome for the user or the applications to designate the individual link metrics according to requirements. Therefore, in order to facilitate the designation of the link metrics, the present embodiment is configured so that in determination of precedence of the links, the link manager 1 makes a pattern of priorities of link metrics desired to give priority and defines it as a preference.

FIG. 4 is a diagram showing an example of preferences. "Cost" (cost priority preference) is a preference for such selection of a link as to minimize the cost. "Quality" (transmission quality priority preference) is a preference for such selection of a link as to maximize the transmission quality. "Security" (security priority preference) is a preference for such selection of a link as to ensure security. "Communication time" (communication time priority preference) is a preference for such selection of a link as to maintain communications over a period as long as possible.

Figure 5:
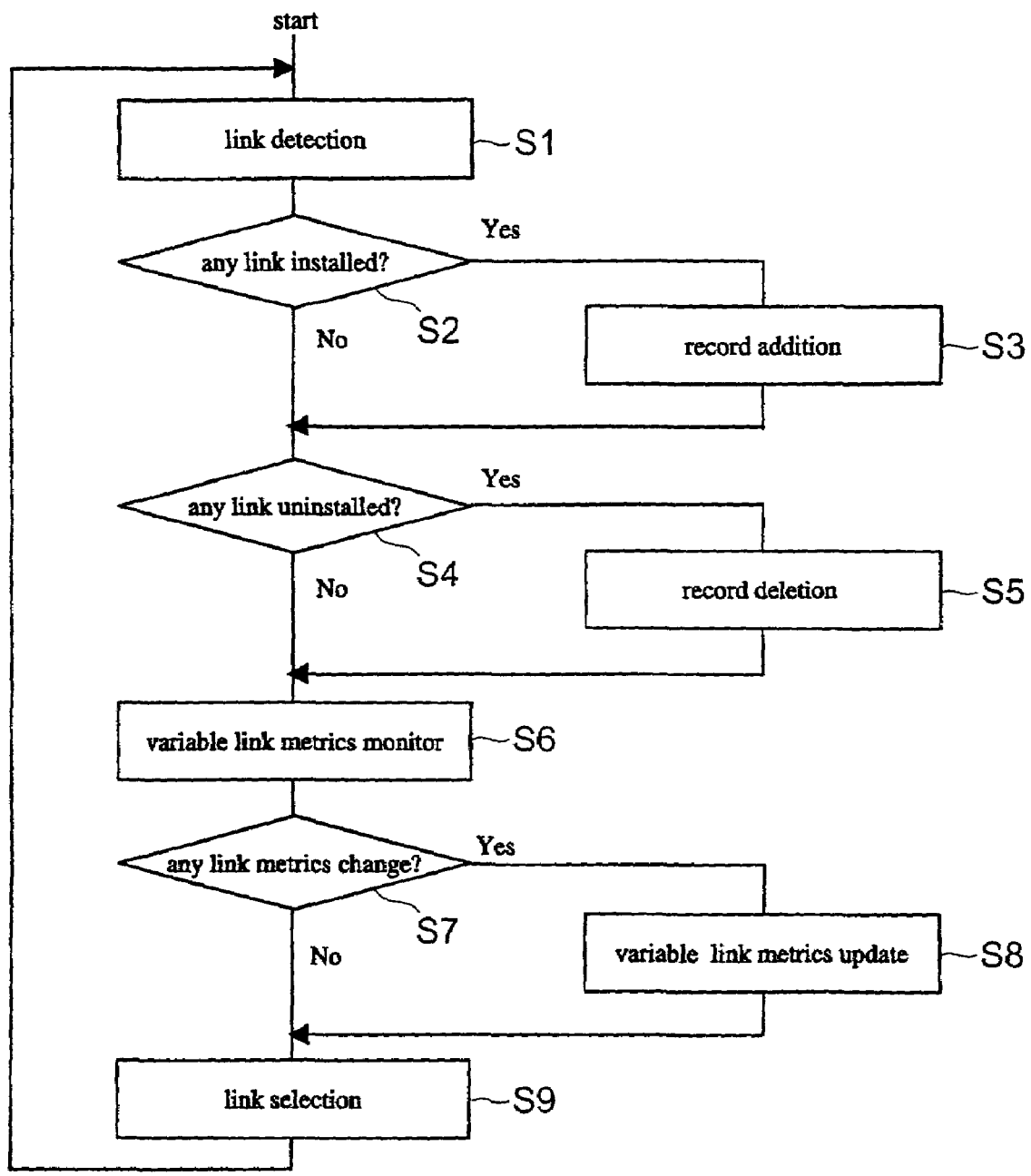
FIG. 5 is a flowchart showing the operation of the link manager.

The following will describe the operation of the link manager 1 constructed as described above. FIG. 5 is a flowchart showing the operation of the link manager 1. First, the link manager 1 performs link detection (link detecting process) (step S1). This link detecting process is a process of detecting what links are installed on the mobile host. By this link detecting process, it is determined whether a new link is installed or whether a link having been used heretofore is uninstalled.

FIG. 6 is a diagram showing a link management table used in the link detecting process. The link management table is comprised of a plurality of records corresponding to the respective links. A record includes data corresponding to the link metrics of one link.

When a link corresponding to neither of the records in this link management table is detected, the link manager determines that a new link was installed on the mobile host (step S2), and then performs record addition (a record adding process) (step S3). This record adding process is a process of adding a new record to the link management table to record the link metrics of the link. Since the variable link metrics are not gained at this stage, only the constant link metrics are recorded. The constant link metrics are obtained by a method in which the user manually notifies the link manager 1 of the link metrics, a method of automatically notifying the link manager 1 of the link metrics upon mounting of the interface of the link, and so on.

On the other hand, when a link existing as a record in the link management table becomes undetectable, the link manager determines that the link was uninstalled (step S4), and then performs record deletion (a record deleting process) (step S5). This record deleting process is a process of deleting the associated record from the link management table.

Then the link manager 1 performs variable link metrics monitor (a variable link metrics monitoring process) (step S6). The variable link metrics monitoring process is a process of monitoring the variable link metrics recorded in the link management table. The variable link metrics except for the metric "enabled/disabled," which is a metric set by the user, vary their states, depending upon movement of the mobile host and others. The connectivity can or cannot be obtained from the interface device of the link. When it cannot be obtained, the connectivity is detected, for example, by making use of Router advertisement packets for advertising locations of IPv6 routers to the mobile host. Since Router advertisement packets are periodically sent from the routers to the mobile host, it can be determined that the link is connectible as long as the mobile host can periodically receive the Router advertisement packets and that the link is unconnectible if the mobile host fails to receive the Router advertisement packets.

The throughput, packet loss rate, and transmission latency can or cannot be obtained from the interface device of the link as well. When they cannot be obtained, they are determined, for example, by use of the Router advertisement packets of IPv6. The throughput can be calculated by the equation (Eq. 1) below, using a length L of a Router advertisement packet, a send time Ts of the Router advertisement packet at a router, and a receive time Tr of the Router advertisement packet at the mobile host.

$$\text{Throughput } [bps] = L/(T_r - T_s) \quad [\text{Eq. 1}]$$

The packet loss rate can be calculated by the equation (Eq. 2) below, using the number P of Router advertisement packets received, and a maximum sequence number $S_{max}$ and a minimum sequence number $S_{min}$ included in the received Router advertisement packets.

$$\text{Packet loss rate } [\%] = P/(S_{max} - S_{min}) \quad [\text{Eq. 2}]$$

The transmission latency can be calculated by the equation (Eq. 3) below, based on reception of a Router advertisement packet including a send time at a router.

$$\text{Transmission latency } [sec] = T_r - T_s \quad [\text{Eq. 3}]$$

If the throughput, the packet loss rate, and the transmission latency vary largely, each of them can be obtained as an average value.

Then the link manager 1 determines whether there is any change in the variable link metrics (step S7). A decision is made by comparing the result of the monitoring with the data recorded in the link management table. When there is a change in the link metrics, the link manager 1 performs variable link metrics update (a link metrics updating process) (step S8). This link metrics updating process is a process of recording new variable link metrics in the associated record of the link management table.

Then the link manager 1 performs link selection (a link selecting process) (step S9). The link selecting process is a process of selecting a link most adapted to the preference designated by the user or the applications. In this process, the link manager 1 provides only the newly selected link to the higher IP mobility management (IP mobility protocols) and then moves to the link detecting process at step S1.

Figure 7:
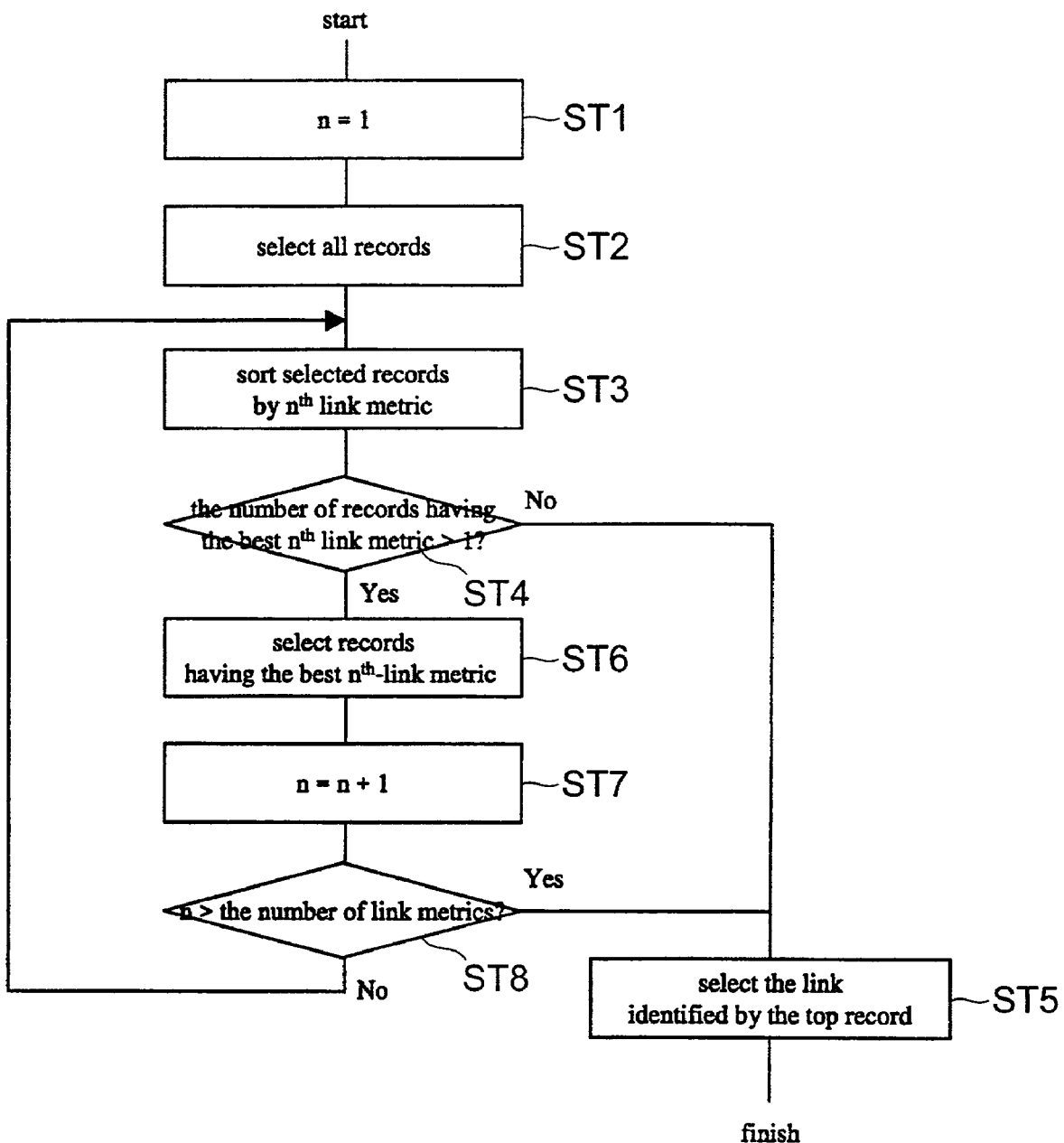
FIG. 7 is a flowchart of a link selecting process.

FIG. 7 is a flowchart of the link selecting process at step S9 of FIG. 6. The link manager 1 sorts all the records in the link management table shown in FIG. 6, using the link metric with the highest priority in FIG. 4 as a key. Specifically, noting the link metric with the highest priority, it is set as n=1 (step ST1) and all the records are selected (step ST2). Here ranks indicating precedence levels are assigned to the data corresponding to the respective link metrics. FIG. 8 is a diagram showing the priority ranks of the data corresponding to the respective link metrics. For example, as to the data corresponding to the link metric "cost," "free" is provided with the highest priority and "time-based" with the lowest priority. The records selected at step ST2 are sorted based on these priorities assigned to the data (step ST3). Then it is determined whether the number of records having the data with the highest priority is equal to one (step ST4). If the number is one, the link identified by the top record is selected (step ST5).

On the other hand, if the number of records having the data with the highest priority is not equal to one, attention is then focused on the link metric with the second highest priority (step ST6), it is set as n=n+1 (step ST7), and it is then determined whether the value of n+1 is equal to an ordinal rank of the link metric with the lowest priority (step ST8). Since the ordinal rank at this stage is still the second, the link manager proceeds to step ST3 to sort the records according to the ranks assigned to the data corresponding to the link metric with the second priority (step ST4).

This operation is continued before the number of records having the data with the highest priority becomes equal to one or before the sorting with the link metric of the lowest rank as a key is finished. After the sorting with the link metric of the lowest rank as a key is finished, the link manager selects the link corresponding to the record at the top position (step ST5). Before reaching the lowest rank, the link manager transfers to step ST3. Since the lowest rank is the twelfth in FIG. 4, it is determined at step ST8 whether the sorting with the twelfth link metric as a key is finished.

The present embodiment was described about the operation carried out when the user or the applications designated one preference and provided it for the link manager, but the present invention is not limited to this example and also permits such an operation that the applications designate a plurality of preferences and the link manager provides a plurality of links complying with the preferences. The applications sometimes have requirements different among the applications, e.g., for transmission quality and the like, and it is thus effective to designate different preferences among the applications.

In the present embodiment the user or the applications designated the preference, but the IP mobility protocols may designate the preference. Since the IP mobility protocols sometimes have some control modes and execute different control procedures, the requirements for the link can differ among the control modes. In this case, it is effective that the IP mobility protocols designate either of different preferences and provide it for the link manager at every switching of the operating mode.

For example, when detecting that there occurs no transmission of packet for a fixed period, the IP mobility protocols switch the operating mode from a control mode that permits continuous transmission of packets, to a control mode that permits intermittent transmission of packets. The former will be referred to as an active mode and the latter as a sleep mode. On the other hand, when a need arises for continuous transmission of packets in the control mode of the sleep mode, the IP mobility protocols switch the control mode to the active mode.

When switching the control mode from the active mode to the sleep mode, the IP mobility protocols request the link manager to preferentially select a link where the sleep mode support is active. The link manager selects a link where the sleep mode support is active in accordance with this request. At the link where the sleep mode support is active, power consumption can be reduced, for example, by intermittent operation of the receiver.

Further, the present embodiment was described about the method wherein the user or the applications selected either of the predetermined preferences, but the system may also be configured so that the user or the applications can arbitrarily set an order of comparative priorities of the link metrics.

The present embodiment was configured to select only one best link and provide it for the IP mobility protocols, but another potential configuration is such that a predetermined number of links are selected to be provided for the IP mobility protocols. In this configuration, it becomes feasible to raise the transmission success rate of packets in such a way that the IP mobility protocols make copies of each single packet and transmit them through a plurality of links, or to increase the throughput in such a way that different packets are transmitted through a plurality of links.

Further, the present embodiment was described about the operation carried out when only one link of each kind was installed on the mobile host, but the present invention is also applicable to configurations wherein a plurality of links of the same kind are installed on the mobile host. For example, in the case where in a cellular communication system the mobile host can simultaneously handle a plurality of links provided by visiting and surrounding base stations, the link manager is allowed to select a link of an optimal base station, based on the preference.

The link manager according to the present invention is configured to comprise the detecting means for detecting what link is installed; the managing means for defining a plurality of link metrics indicating the characteristics of each detected link and managing the data corresponding to the respective link metrics on the table; and the selecting means for selecting a link having the link metrics complying with the given condition.

According to the present invention, a link complying with the condition requested by the user or the applications is automatically selected out of the plurality of various links installed on the mobile host, which makes it feasible to provide comfortable connection environments for the user of the mobile host.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A link manager comprising:
    detecting means for detecting a link installation;
    managing means for defining a plurality of link metrics, each link metric being defined by a plurality of characteristics of each said link detected, and managing data corresponding to said respective link metrics on a table;
    link metric rank assigning means for assigning ranks to said respective link metrics, based on a predetermined preference;
    data rank assigning means for assigning ranks to each of said plurality of characteristics defining each of said respective link metrics; and
    a processor configured to select a link by comparing each individual stored metric corresponding to each link in order of rank by individually comparing each of said plurality of characteristics defining each of said respective link metrics in the order assigned by the data rank assigning means, and select a link corresponding to a record having a characteristic with a highest rank thus assigned, at a link metric with a highest rank.

2. The link manager according to claim 1, wherein said managing means generates a record comprised of the data corresponding to said respective link metrics, for each link on said table.

3. The link manager according to claim 2, wherein said managing means generates a record corresponding to a new link and records data corresponding to link metrics of said link when a new link corresponding to neither said record is detected and said managing means deletes said record when a link corresponding to either said record becomes undetectable.

4. A link management method performed by a link manager apparatus, the method comprising:
    detecting a link installation;
    defining a plurality of link metrics, each link metric being defined by a plurality of characteristics of each said link detected and managing data corresponding to said respective link metrics on a table;
    assigning ranks to said respective link metrics, based on a predetermined preference;
    assigning ranks to each of said plurality of characteristics defining each of said respective link metrics; and selecting, at a processor at said link manager apparatus, a link by comparing each individual stored metric corresponding to each link in order of rank by individually comparing each of said plurality of characteristics defining each of said respective link metrics in order of the assigned ranks, and selecting a link corresponding to a record having a characteristic with a highest rank thus assigned, at a link metric with a highest rank.

5. The link management method according to claim 4, further comprising:
generating a record comprised of the data corresponding to said respective link metrics, for each link on said table.

6. The link management method according to claim 5, further comprising:
generating a record corresponding to a new link and recording data corresponding to link metrics of said link when a new link corresponding to neither said record is detected; and
deleting said record when a link corresponding to either said record becomes undetectable.

7. A computer program product including a computer-readable memory with a computer program code mechanism stored therein, which when executed by a computer causes the computer to perform a method of link management, comprising:
detecting a link installation;
defining a plurality of link metrics, each link metric being defined by a plurality of characteristics of each said link detected and managing data corresponding to said respective link metrics on a table;
generating a record comprised of the data corresponding to said respective link metrics, for each link on said table;
assigning ranks to said respective link metrics, based on a predetermined preference;
assigning ranks to each of said plurality of characteristics defining said respective link metrics;
comparing each individual metric corresponding to each link in order of rank by individually comparing each of said plurality of characteristics defining each of said respective link metrics in the order of the assigned ranks; and
selecting a link corresponding to a record having a characteristic with a highest rank thus assigned, at a link metric with a highest rank.

8. The computer program product according to claim 7, further comprising:
generating a record corresponding to a new link and recording data corresponding to link metrics of said link when a new link corresponding to neither said record is detected; and
deleting said record when a link corresponding to either said record becomes undetectable.

9. A link manager comprising:
detecting means for detecting a link installation;
managing means for defining a plurality of constant link metrics and variable link metrics, each constant and variable link metric being defined by a plurality of characteristics of each said link detected and managing data corresponding to said respective link metrics on a table, said managing means monitoring the variable link metrics which vary over time;
link metric rank assigning means for assigning ranks to said constant and variable link metrics, and assigning ranks to each of said plurality of characteristics defining each of said constant and variable link metrics; and
a processor configured to select a link by comparing each individual stored constant and variable link metric corresponding to each link in order of rank by individually comparing each of said plurality of characteristics defining each of said respective link metrics in the order assigned by the link metric rank assigning means, and select a link corresponding to a record having a characteristic with a highest rank thus assigned, at a constant or variable link metric with a highest rank.

10. The link manager according to claim 9, wherein
said managing means generates a record comprised of the data corresponding to said respective constant and variable link metrics, for each link on said table.

11. The link manager according to claim 10, wherein
said managing means generates a record corresponding to a new link and records data corresponding to constant and variable link metrics of said link when a new link corresponding to neither said record is detected; and
said managing means deletes said record when a link corresponding to either said record becomes undetectable.

12. A link management method performed by a link manager apparatus, the method comprising:
detecting a link installation;
defining a plurality of constant link metrics and variable link metrics, each constant and variable link metric being defined by a plurality of characteristics of each said link detected and managing data corresponding to said respective link metrics on a table;
assigning ranks to said constant and variable link metrics;
assigning ranks to each of said plurality of characteristics defining each of said constant and variable link metrics; and
selecting, at a processor of said link manager apparatus, a link by comparing each individual stored constant and variable metric corresponding to each link in order of rank by individually comparing each of said plurality of characteristics defining each of said respective link metrics in order of the assigned ranks, and selecting a link corresponding to a record having a characteristic with a highest rank thus assigned, at a constant or variable link metric with a highest rank.

13. The link management method according to claim 12, further comprising:
generating a record comprised of the data corresponding to said respective constant and variable link metrics, for each link on said table.

14. The link management method according to claim 13, further comprising:
generating a record corresponding to a new link and recording data corresponding to constant and variable link metrics of said link when a new link corresponding to neither said record is detected; and
deleting said record when a link corresponding to either said record becomes undetectable.

15. A computer program product including a computer-readable memory with a computer program code mechanism stored therein, which when executed by a computer causes the computer to perform a method of link management, comprising:
detecting a link installation;
defining a plurality of constant link metric and variable link metrics, each constant and variable link metric being defined by a plurality of characteristics of each said link detected and managing data corresponding to said respective link metrics on a table;
generating a record comprised of the data corresponding to said respective constant and variable link metrics, for each link on said table;

assigning ranks to said respective link metrics, based on a predetermined preference;

assigning ranks to each of the plurality of characteristics corresponding to said respective constant and variable link metrics;

comparing each individual constant and variable link metric corresponding to each link in order of rank by individually comparing each of said plurality of characteristics defining each of said respective link metrics in the order of the assigned ranks; and selecting a link corresponding to a record having a characteristic with a highest rank thus assigned, at a link metric with a highest rank.

16. The computer program product according to claim 15, further comprising:

generating a record corresponding to a new link and recording data corresponding to constant and variable link metrics of said link when a new link corresponding to neither said record is detected; and deleting said record when a link corresponding to either said record becomes undetectable.

17. A link manager comprising:

a detector configured to detect a link installation;

a processor configured to define a plurality of constant link metrics and variable link metrics, each constant and variable link metric being defined by a plurality of characteristics of each said link detected and managing data corresponding to said respective link metrics on a table;

a processor configured to assign ranks to said constant and variable link metrics, and assigning ranks to each of said plurality of characteristics defining each of said constant and variable link metrics; and a processor configured to select a link by comparing each individual stored constant and variable link metric corresponding to each link in order of rank by individually comparing each of said plurality of characteristics defining each of said respective link metrics in the order assigned by the data rank assigning means, and selecting a link corresponding to a record having a characteristic with a highest rank thus assigned, at a constant or variable link metric with a highest rank.

18. A link manager comprising:

a detector configured to detect a link installation;

a processor configured to define a plurality of link metrics, each link metric being defined by a plurality of characteristics of each detected link;

an interface configured to receive an input to rank said respective link metrics and receive an input to rank each of said plurality of characteristics defining each of said respective link metrics; and a processor configured to select a link by comparing each individual stored metric corresponding to each link in order of rank by individually comparing each of said plurality of characteristics defining each of said respective link metrics in the order assigned by the data rank assigning means, and select a link corresponding to a record having a characteristic with a highest rank thus assigned, at a link metric with a highest rank.

* * * * *